United States Patent [19]
Yamaguchi

[11] Patent Number: 5,832,301
[45] Date of Patent: Nov. 3, 1998

[54] PRINTER SERVER SYSTEM FOR INTERRUPTING A JOB FROM A FIRST TERMINAL FOR A JOB FROM A SECOND TERMINAL BASED ON DETECTED PRIORITIES

[75] Inventor: Kotaro Yamaguchi, Kawasaki, Japan

[73] Assignee: Canon Kabushiki Kaisha, Tokyo, Japan

[21] Appl. No.: 745,739

[22] Filed: Nov. 12, 1996

[30] Foreign Application Priority Data

Nov. 20, 1995 [JP] Japan ................................. 7-301253

[51] Int. Cl.⁶ .................................................. G06F 3/12
[52] U.S. Cl. ........................................ 395/868; 395/101
[58] Field of Search ................................ 395/868, 101, 395/113, 114; 707/500

[56] References Cited

U.S. PATENT DOCUMENTS

| | | | |
|---|---|---|---|
| 4,891,769 | 1/1990 | Tasaki | 395/106 |
| 5,327,526 | 7/1994 | Nomura et al. | 395/115 |
| 5,418,904 | 5/1995 | Tomiyasu et al. | 395/114 |
| 5,500,715 | 3/1996 | Ta et al. | 399/1 |
| 5,630,030 | 5/1997 | Kawamura | 395/115 |

*Primary Examiner*—Gopal C. Ray
*Attorney, Agent, or Firm*—Fitzpatrick, Cella, Harper & Scinto

[57] ABSTRACT

In a printer server system in which a file server controls image data to be output by a printer server and information for performing queuing of a print command, when there is a request of an interrupt input job without passing through the file server from another client terminal while a job of a client terminal is being executed, a priority level for the job being executed and a priority level for the interrupt input job are compared with each other. The job being executed is interrupted when it has been determined that the priority level for the interrupt input job is higher than the priority level for the job being executed. A trigger command for output processing for the printer server from the client terminal which has provided the interrupt input job is accepted, and a corresponding image is output from the printer server in response to the trigger command.

13 Claims, 14 Drawing Sheets

FIG.7

QUEUE ENTRY TABLE 10200

| QUEUE ENTRY TABLE ID 10207 |
|---|
| QUEUE TYPE 10202 |
| . . . . . . . . . . . |
| TOTAL NUMBER OF QUEUES (N) 10208 |
| REGISTERED-QUEUE ID : 1 10209<br>QUEUE TABLE |
| REGISTERED-QUEUE ID : 2 10209<br>QUEUE TABLE |
| . . . |
| REGISTERED-QUEUE ID : N 10209<br>QUEUE TABLE |

FIG.8

QUEUE TABLE 10209
- SERVER ID 10301 NETWORK ID
- MAXIMUM REGISTERED NUMBER OF QUEUES 10312
- REMAINING CAPACITY OF QUEUING FILE 10313
- DEVICE TYPE 10302
- QUEUE TYPE 10303
- QUEUE STATUS 10304
- TOTAL QUEUES 10306
- EXECUTION QUEUE 10307
- JOB DATA 10320
- ...
- JOB DATA 10320

JOB DATA 10320
- JOB TYPE 10321
- JOB ID 10308
- QUEUE-FILE ID 10305
- JOB STATUS 10309
- TOTAL PRINTS 10310
- NUMBER OF PRINTED SHEETS 10311
- CLIENT-NETWORK ID 10315
- PRIORITY LEVEL 10314

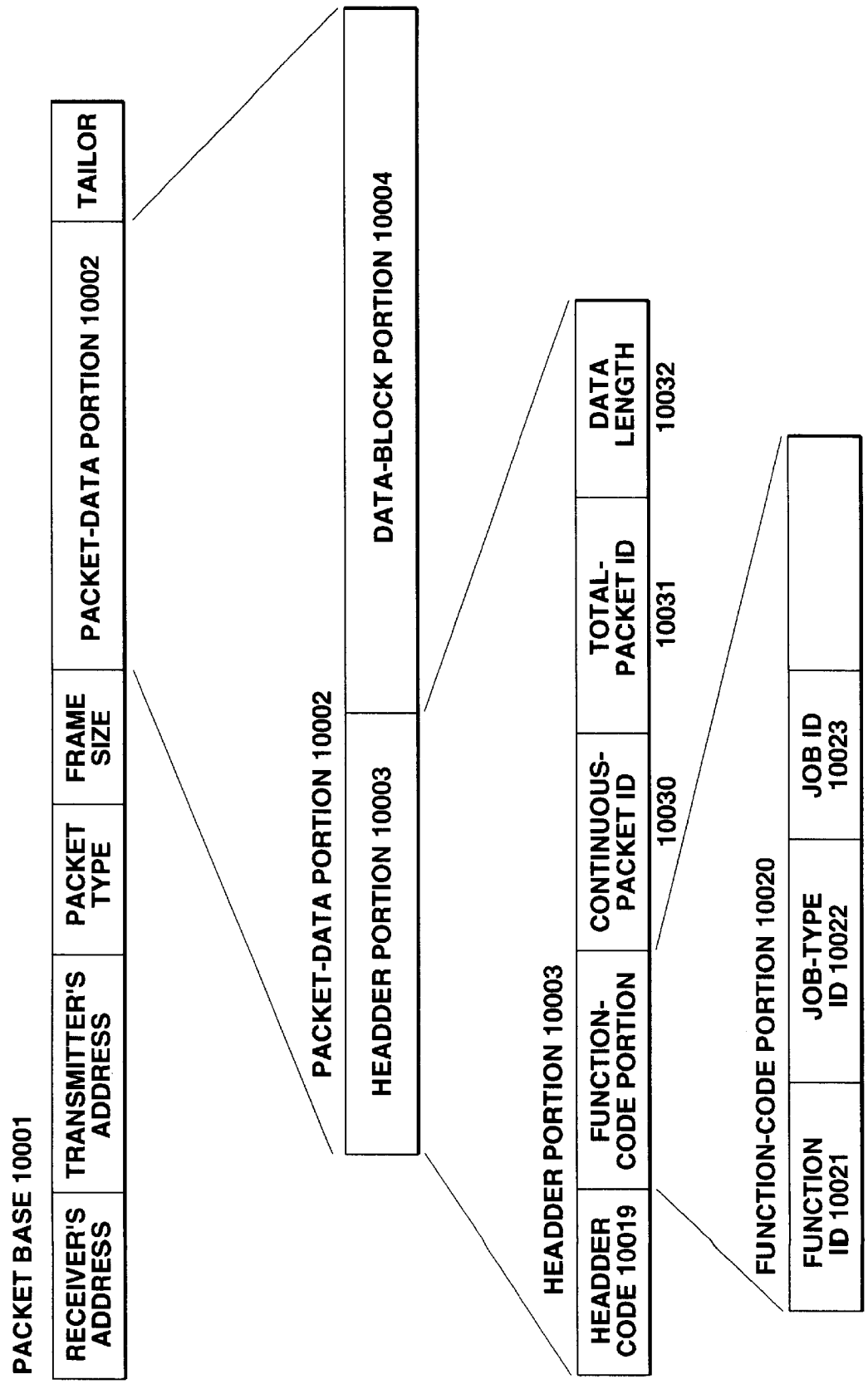

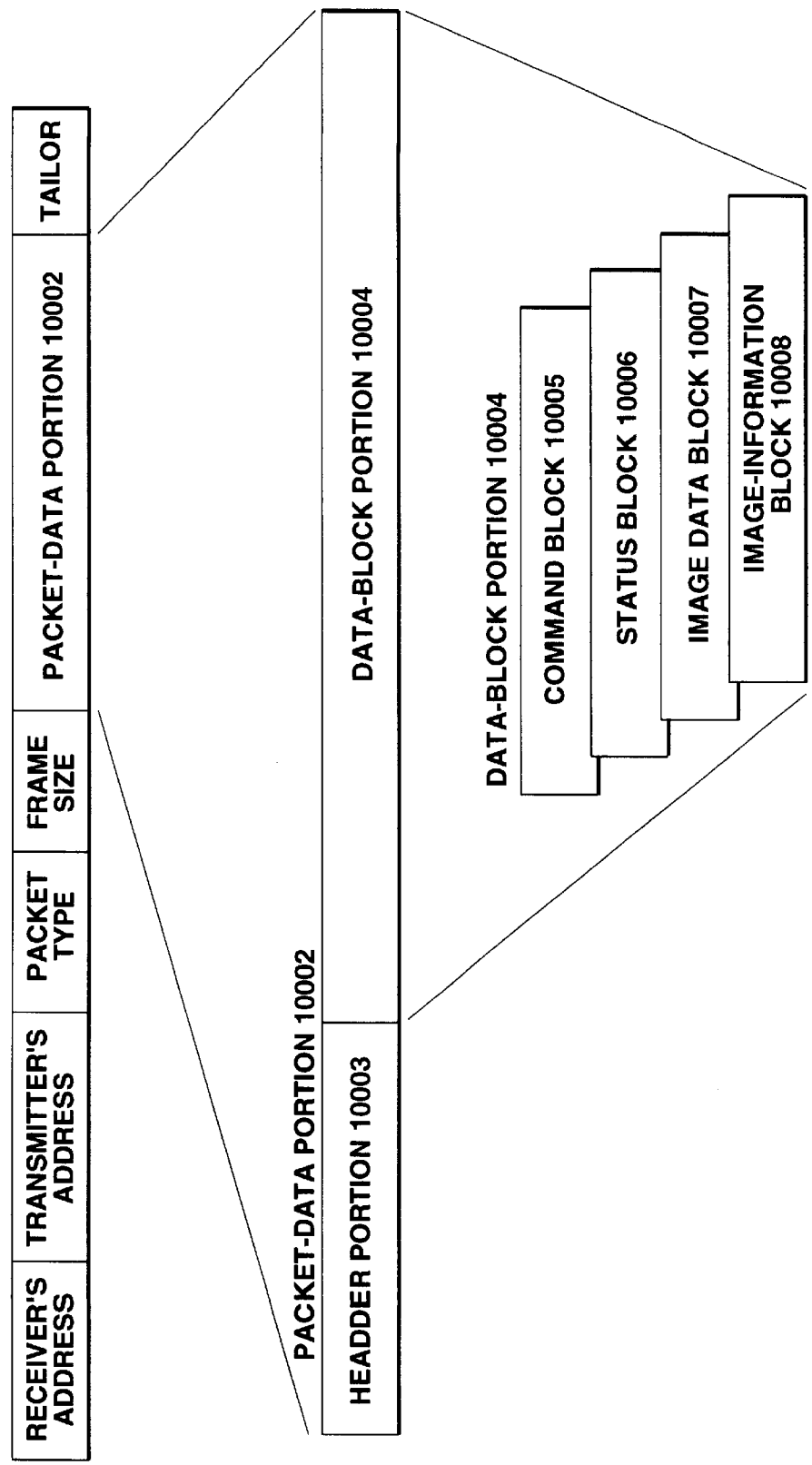

FIG.11

PACKET BASE 10001

| RECEIVER'S ADDRESS | TRANSMITTER'S ADDRESS | PACKET TYPE | FRAME SIZE | PACKET-DATA PORTION | TAILOR |
|---|---|---|---|---|---|

PACKET-DATA PORTION 10001-2

| HEADDER... | CONTINUOUS-PACKET ID (0) | TOTAL-PACKET ID (7) | DATA-BLOCK PORTION (0) |
|---|---|---|---|

PACKET-DATA PORTION 10001-3

| HEADDER... | CONTINUOUS-PACKET ID (1) | TOTAL-PACKET ID (7) | DATA-BLOCK PORTION (1) |
|---|---|---|---|

. . .

PACKET-DATA PORTION 10001-4

| HEADDER... | CONTINUOUS-PACKET ID (6) | TOTAL-PACKET ID (7) | DATA-BLOCK PORTION (6) |
|---|---|---|---|

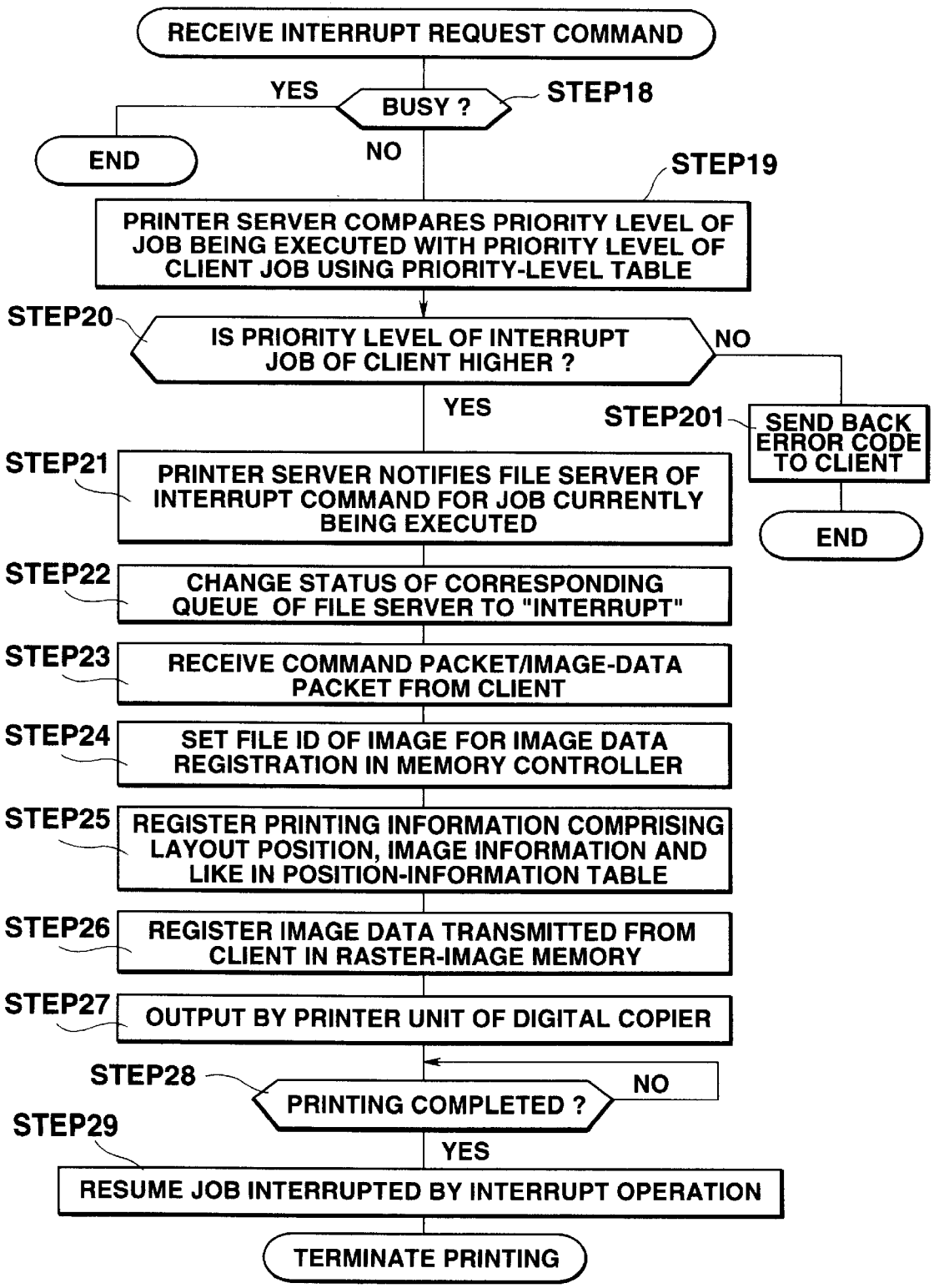

PRINTER SERVER SYSTEM FOR INTERRUPTING A JOB FROM A FIRST TERMINAL FOR A JOB FROM A SECOND TERMINAL BASED ON DETECTED PRIORITIES

BACKGROUND OF THE INVENTION

1. Field of the Invention

This invention relates to a printer server system in which a plurality of client users share a printer function on a network, and to a method for controlling such a system.

2. Description of the Related Art

A configuration in which a plurality of computer apparatuses, such as personal computers, word processors or the like, are connected to a network and data is exchanged between the apparatuses has been known. So-called server systems in which peripheral apparatuses, such as printers, scanners, memories or the like, are connected to a network and are shared by a plurality of computer apparatuses have been proposed. In these systems, a printer server function in which a plurality of computer apparatuses share a single printer is frequently utilized, because the printer which is expensive but is not always required to operate can be shared by a plurality of users.

However, in conventional printer server systems, when a job is being executed in the printer server, a printing job request newly provided from a client is first subjected to queuing in a file server, and printing processing corresponding to the request is executed after completing the printing job already subjected to queuing. Accordingly, even when it is intended to urgently obtain print output, the client must wait until processing of any job already subjected to queuing is completed.

OBJECTS AND SUMMARY OF THE INVENTION

The present invention has been made in consideration of the above-described problems.

It is an object of the present invention to provide a printer server system in which a plurality of client users can efficiently share a printer function on a network, and to provide a method for controlling such a system.

It is another object of the present invention to provide a printer server system capable of dealing with print output requiring a real-time operation in a configuration in which a plurality of client users share a printer function on a network, and to provide a method for controlling such a system.

It is still another object of the present invention to provide a printer server system capable of providing print output requiring a real-time operation without hindering a printing operation by ordinary queue control in a configuration in which a plurality of client users share a printer function on a network, and to provide a method for controlling such a system.

According to one aspect, the present invention which achieves these objectives relates to a printer server system in which a plurality of client terminals connected to a network share a printer function, comprising, means for comparing a priority level for the job being executed and a priority level for the interrupt input job with each other when there is a request for an interrupt input job from another client terminal while a job of a client terminal is being executed, means for interrupting the job being executed when it has been determined that the priority level for the interrupt input job is higher than the priority level for the job being executed, means for accepting a trigger command for print output from the client terminal which has provided the interrupt input job, after the interruption, and means for outputting a corresponding image in response to the trigger command.

According to another aspect, the present invention which achieves these objectives relates to a method for controlling a printer server system, having a configuration in which a plurality of client terminals, a file server and a printer server are connected on the same network, in which the file server controls raster-image data to be subjected to print output and information for performing queuing of a print command, comprising the steps of comparing a priority level for the job being executed and a priority level for the interrupt input job with each other when there is a request for an interrupt input job without passing through the file server from another client terminal while a job of a client terminal is being executed, interrupting the job being executed when it has been determined that the priority level for the interrupt input job is higher than the priority level for the job being executed, accepting a trigger command for output processing for the printer server from the client terminal which has provided the interrupt input job, and outputting a corresponding image from the printer server in response to the trigger command.

The foregoing and other objects, advantages and features of the present invention will become more apparent from the following description of the preferred embodiment taken in conjunction with the accompanying drawings.

BRIEF DESCRIPTION OF THE DRAWINGS

FIG. 7 is a diagram illustrating the configuration of a cueing entry table;

FIG. 8 is a diagram illustrating the configuration of a cueing table;

FIG. 9 is a diagram illustrating the configuration of a network packet portion;

FIG. 10 is a diagram illustrating the configuration of a data block portion of a network packet;

FIG. 11 is a diagram illustrating the configuration of a continuous network packet;

FIG. 14 is a flowchart illustrating the printing processing procedures of the printer server in the embodiment.

DESCRIPTION OF THE PREFERRED EMBODIMENT

A printer server system according to an embodiment of the present invention will now be described in detail with reference to the drawings.

Figure 1:
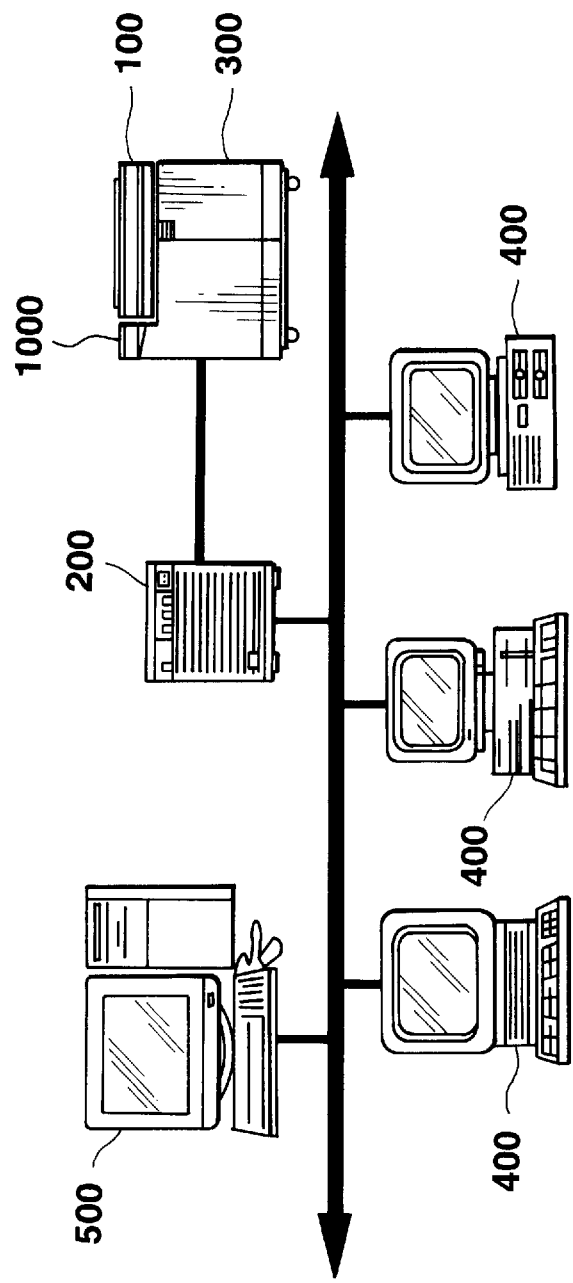
FIG. 1 is a diagram illustrating the configuration of a printer server system according to an embodiment of the present invention.

FIG. 1 is a diagram illustrating the configuration of the printer server system of the embodiment.

As shown in FIG. 1, the system of the embodiment comprises a digital copier 1000 comprising a digital color image reading unit (hereinafter termed a "scanner unit") 100 and a digital color image printing unit (hereinafter termed a "printer unit") 300, a printer server 200 for connecting the digital copier 1000 to a network 1, a file server 500, connected to the network 1, for supporting a file system on the network 1, and a plurality of client-user computers 400 connected to the network 1.

Figure 2:
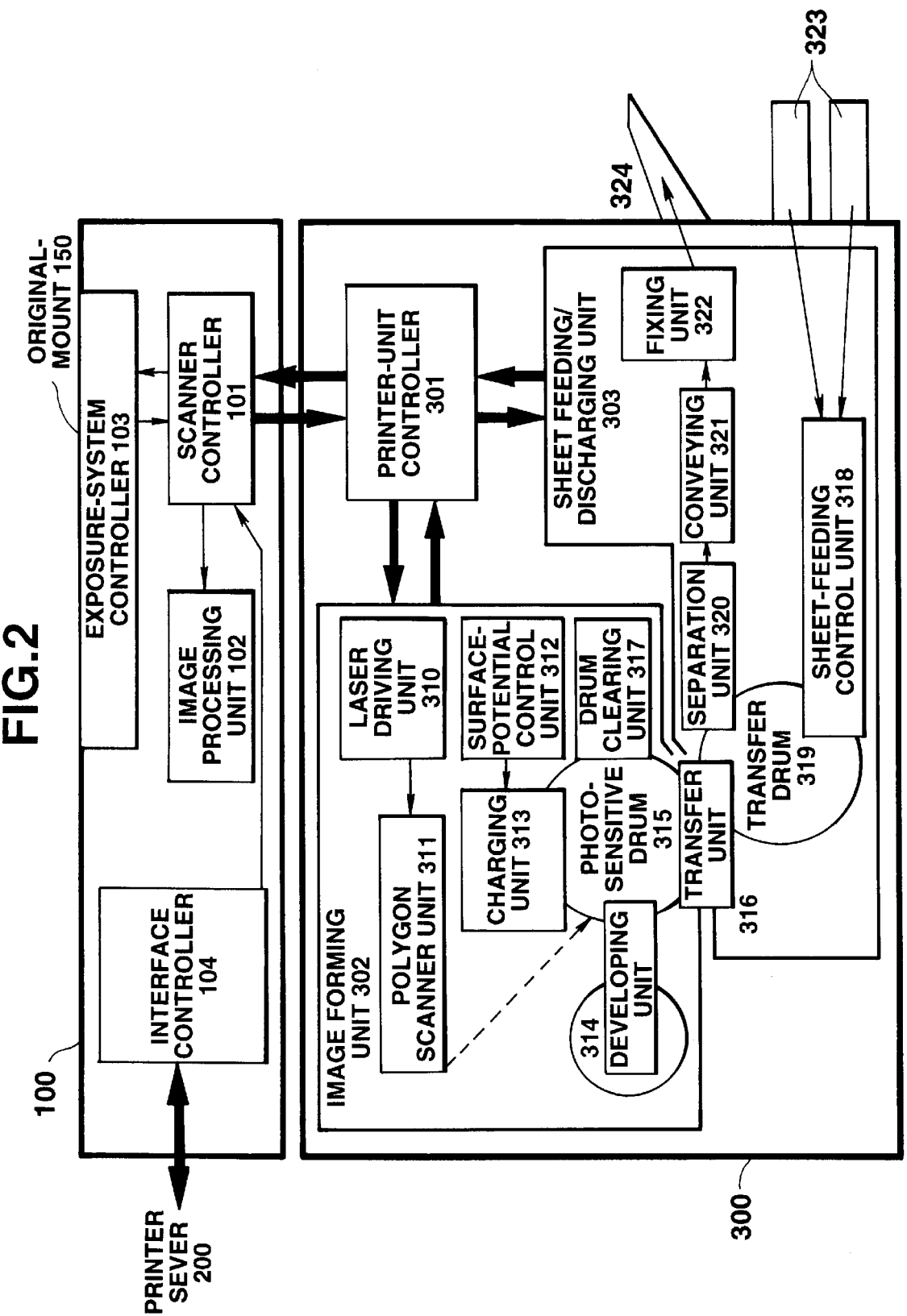
FIG. 2 is a diagram illustrating the configuration of a digital color copier shown in FIG. 1.

FIG. 2 illustrates the configuration of the digital copier 1000 having a scanner/printer function.

The scanner unit 100 is controlled mainly by a scanner controller 101, which performs the following controls. First, an exposure-system controller 103 performs color separation of an original mounted on an original-mount for R (red), G (green) and B (blue) colors by controlling a contact-type CCD (charge-coupled device) line sensor, and converts the image of the original into a dot-sequential analog image signal. This analog image signal is converted into 8-bit digital image signals for the respective colors by an A/D (analog-to-digital) conversion unit, and the R, G and B signals indicating luminance are output as line-sequential signals. These image signals (digital signals) indicate the luminance levels for R, G and B colors. An image processing unit 102 converts the signals for the R, G and B luminance levels into digital image signals indicating the density levels for toners of four colors, i.e., C (cyan), M-(magenta), Y (yellow) and Bk (black). At the same time, the image processing unit 102 performs color correction calculation, and also performs various kinds of image processing, such as synthesis, magnification-varying processing, displacement or the like, when necessary.

In the printer unit 300, the C, M, Y and Bk digital image signals (including image signals received from the printer server 200 via an interface controller 104) transmitted from the scanner unit 100 are converted into lighting signals for a semiconductor laser unit. More specifically, a laser driving unit 310 of an image forming unit 302 performs on/off control of laser light in accordance with each image signal and the lighting signal for the laser light is output with a pulse width corresponding to the level of the digital image signal. The laser light has 256 lighting levels (corresponding to 8 bits). The laser light lit in accordance with the digital image signal is projected onto a photosensitive drum 315 via a polygon scanner unit 311. Latent color images for C, M, Y and Bk colors are thereby formed on the photosensitive drum 315 charged to a predetermined potential by a charging unit 313 controlled by a surface-potential control unit 312. The latent color images on the photosensitive drum 315 are sequentially developed by a developing unit 314. The developed color images are sequentially transferred onto a recording sheet fed from a sheet cassette 323 by a sheet-feeding control unit 318 and wound around a transfer drum 319. Finally, the recording sheet having a synthesized color image is separated from the transfer drum 319 by a separation unit 320. The color image on the recording sheet conveyed by a conveying unit 321 is fixed by a fixing unit 322, and the recording sheet having the fixed color image is discharged onto a tray 324. As can be understood from the foregoing description, the printer unit 300 is an electrophotographic laser-beam printer.

Thus, the scanner unit 100 and the color printer unit 300 function as a digital color copier under the control of the scanner unit 100.

That is, when using the above-described combined units as a digital color copier, an original is set on an original-mount 150 of the scanner unit 100, and a copying start key is depressed to form an image according to the above-described processes,. i.e., the reading and image processing of the image by the scanner unit 100, exposure, development, transfer and fixing by the printer unit 300, and the obtained image is output as a color copy.

Data is exchanged with the printer server 200 via the interface controller 104.

Figure 3:
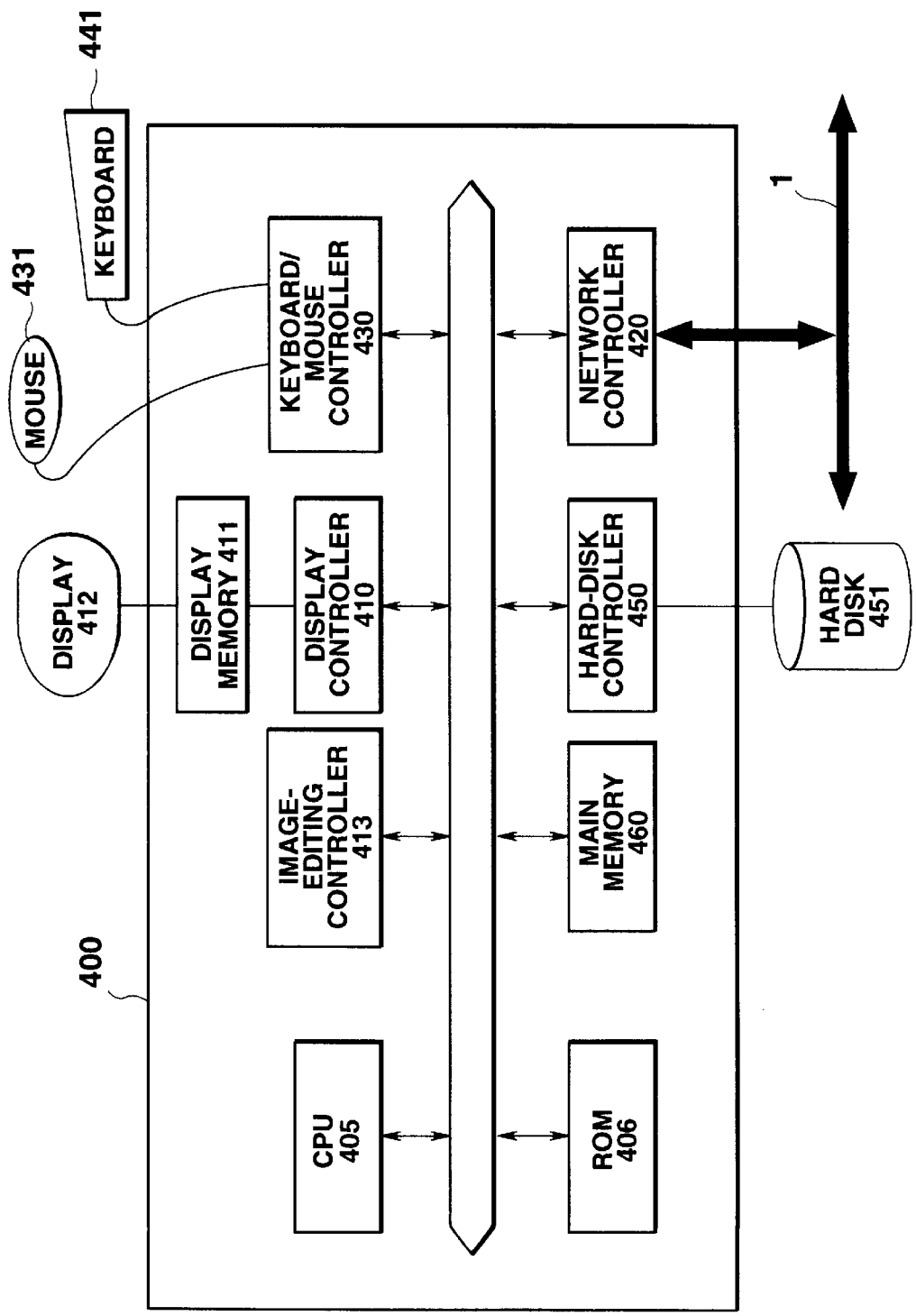
FIG. 3 is a diagram illustrating the configuration of a client computer shown in FIG. 1.

FIG. 3 illustrates the configuration of the client computer 400 on the network 1.

The client computer 400 comprises a network controller 420 for controlling protocols on the network 1 exchanged with the printer server 200 and the file server 500, a CPU (central processing unit) 405 for performing central control of the client computer 400, a hard disk 451 for temporarily registering image data and storing various kinds of data, a hard-disk controller 450 for controlling the hard disk 451, a main memory 460 for storing data for control, a mouse 431 and a keyboard 441, serving as means for inputting instructions from the operator, a keyboard/mouse controller 430 for controlling the mouse 431 and the keyboard 441, a color display 412 for performing layout, editing, menu display or the like, a display memory 411, a display controller 410, and an image-editing controller 413 for performing image layout/editing in the display memory 411.

Figure 4:
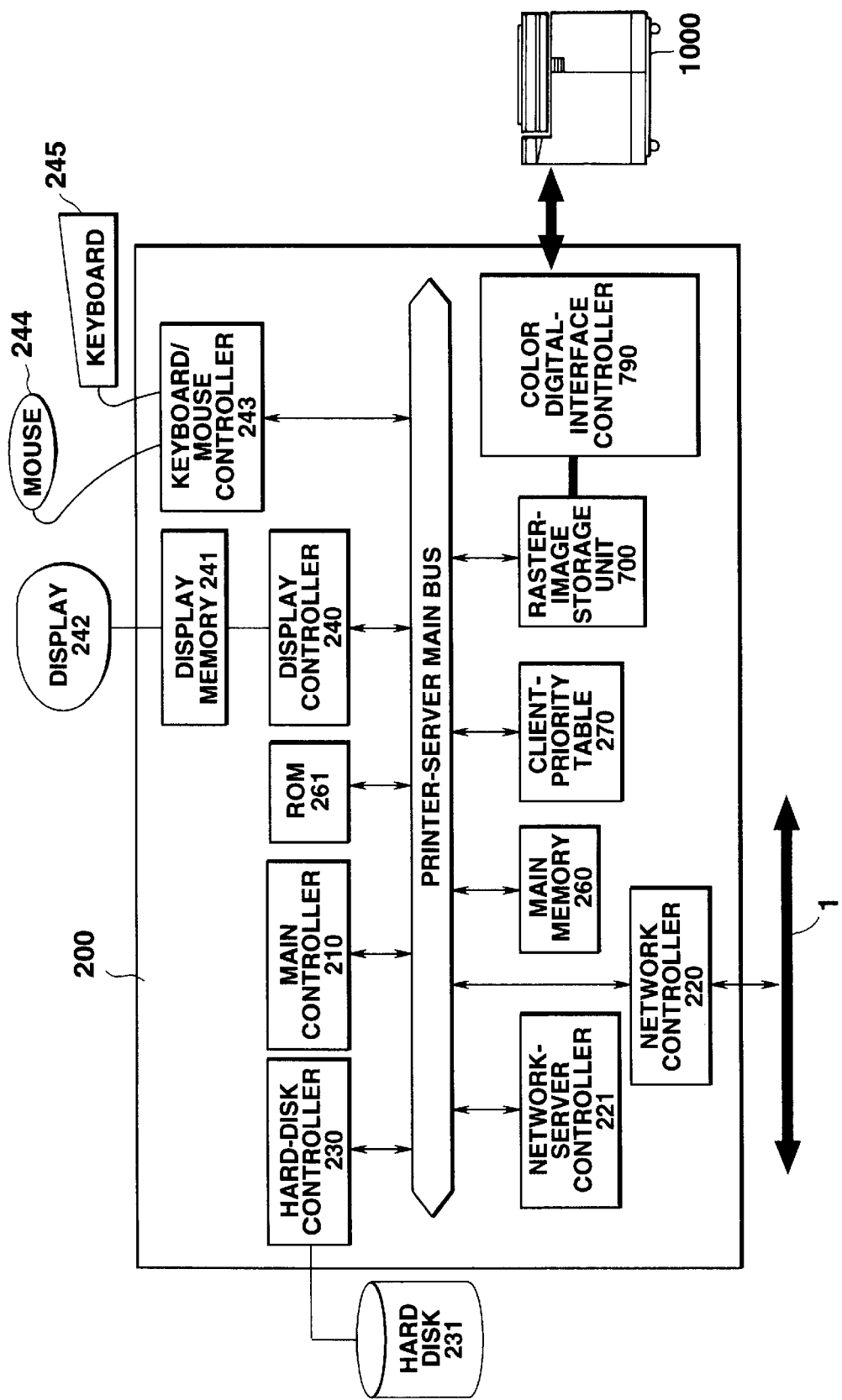
FIG. 4 is a diagram illustrating the configuration of a printer server shown in FIG. 1.

FIG. 4 illustrates the configuration of the printer server 200.

This apparatus generally comprises a main controller 210 for controlling the entire printer server 200, a main memory 260 for storing data for control, a network controller 220 for controlling protocol processing on the network 1, a ROM (read-only memory) 261 for storing programs for control, a network-server controller 221 for performing control as a server, such as analysis of the contents of a packet extracted by a protocol, separation of image data, and the like, a hard-disk controller 230 for controlling at least one hard disk, at least one hard disk 231 connected to the hard-disk controller 230, and a raster-image storage unit 700 for storing/controlling color multivalue raster-image data and the position/attribute information of the data based on separated image data/command data and performing layout and the like.

As for interfaces, the apparatus includes a color-digital-interface controller 790 for exchanging image data, control information, commands and the like with the digital copier 1000, a mouse 244 and a keyboard 245, serving as means for inputting instructions from a server controller, a keyboard/mouse controller 243 for controlling the mouse 244 and the keyboard 245, a display 242 for layout/editing/menu display, a display memory 241, and a display controller 240. Priority levels for respective client computers (to be described later) are stored in a client priority table 270.

Figure 5:
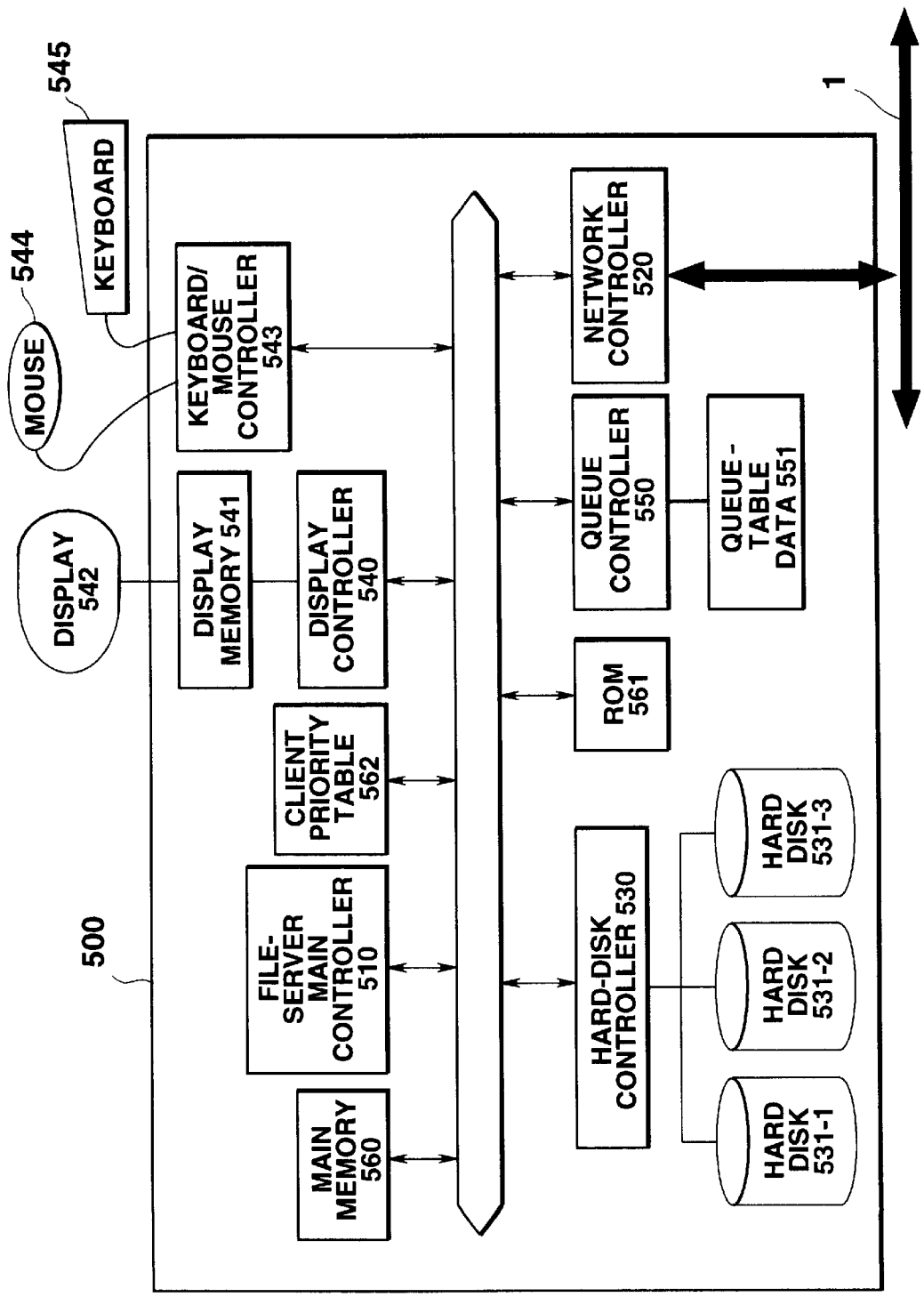
FIG. 5 is a diagram illustrating the configuration of a file server shown in FIG. 1.

FIG. 5 illustrates the configuration of the file server 500.

This apparatus generally comprises a network controller 520 for controlling protocol processing on the network, a file-server main controller 510 for performing control as a server, such as analysis of the contents of a packet extracted by a protocol, separation of image data, and the like, a main memory 560 for storing data for control, a ROM 561 storing control programs, a hard-disk controller 530 for controlling at least one hard disk, a plurality of hard disks 531-1, 531-2 and 531-3 connected to the hard-disk controller 530, a queue controller 550 for controlling queuing-file data registered on the hard disks, queue-table data 551 relating to control information of the queue controller 550, a mouse 544 and a keyboard 545, serving as means for inputting instructions from a file-server controller, a keyboard/mouse controller 543 for controlling the mouse 544 and the keyboard 545, a display 542 for layout/editing/menu display, a display memory 541, and a display controller 540. Priority levels for respective client computers are stored in a client-priority table 562.

Figure 6:
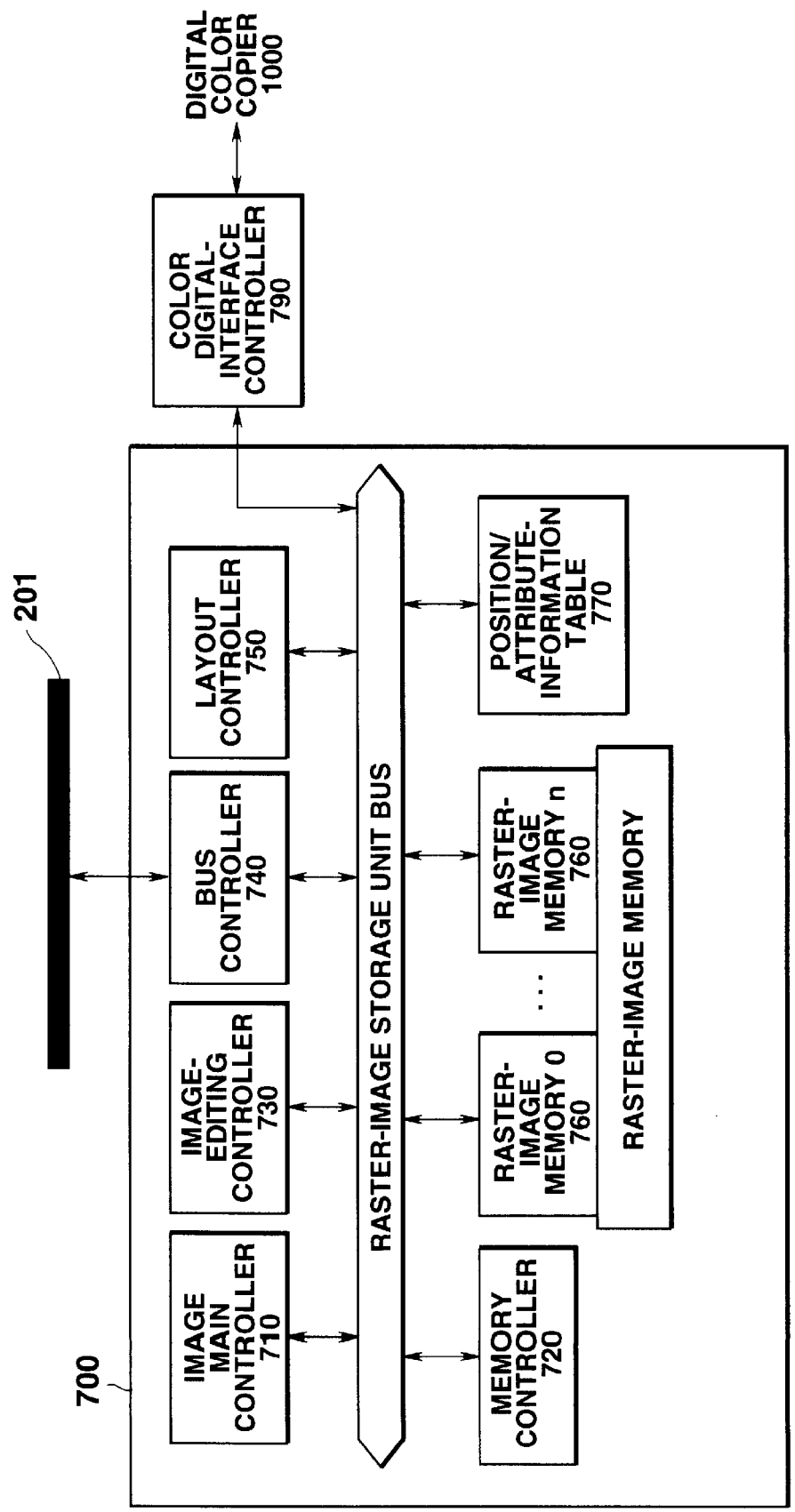
FIG. 6 is a diagram illustrating the configuration of a raster-image storage unit shown in FIG. 4.

FIG. 6 illustrates the configuration of the raster-image storage unit 700 within the printer server 200.

The raster-image storage unit 700 generally comprises an image main controller 710 for controlling the entire raster-image data, a memory controller 720 for efficiently arranging raster-image data in the raster-image memory 760 and controlling the arranged data, a control table 770 for the memory controller 720, an image-editing controller for performing image conversion relating to colors, magnification/reduction/modified editing and the like for registered image data or image data to be registered in the memory, and a layput controller 750 for performing real-time layout editing when outputting data to the printer unit 300.

When outputting image data stored in the memory to the digital color copier 1000, the image data is transferred to the color printer unit 300 via a color-digital-interface controller 790 to obtain a printed image.

Exchange of image data and commands between the raster-image storage unit 700 and a main bus 201 within the printer server 200 is based on a specific format, and is performed between the image main controller 710 and the main controller 210 of the printer server 200 via a bus controller 740.

The raster-image storage unit 700 can control image data in two modes, i.e., a file control mode and a page mode.

The file control mode has the function of storing/controlling a plurality of image data. Layout processing is performed for each of a plurality of registered image data based on a command from the main controller 210 of the printer server 200. The resultant data is output to the color printer unit 300 via the color-digital-interface controller 790 to obtain a printed color image.

At that time, the plurality of image data are controlled by being stored in a plurality of regions of the raster-image memory 760 in the form of an image file. The start address in the memory, the length and the attribute of the image data, position information of layout output of the image data, and the like are registered in the position/attribute information table 770, and are controlled by the memory controller 720. In an actual image outputting operation, each image is placed at an assigned position with an assigned size by the image-editing controller 730 for performing image conversion and magnification/reduction/modified editing of the registered image data and by the layout controller 750 for performing layout editing, and is output from the color printer unit 300 via the color-digital-interface controller 790. Since original image data is always in the memory, it is also possible to output the image data a plurality of times by changing the layout position.

In the page mode, serving as another memory control mode, the raster-image memory 760 is handled as a single sheet and is controlled as to the width/height. When performing layout of images corresponding to a plurality of image data, the plurality of image data are subjected to magnification/reduction/modification and the like by the image-editing controller 730, and are arranged at assigned layout positions in the memory.

Thus, each image data is arranged at a position with a size assigned by the layout controller 750, and the obtained image is output from the printer unit 300 via the color-digital-interface controller 790.

In the present embodiment, in order to perform communication between the client computers 400, the printer server 200 and the file server 500, a group of data strings called a packet as shown in FIG. 9 is used as one block, and packets are exchanged.

As shown in FIG. 9, the packet is configured by the network address of the communication partner (the receiver's address) provided at the head, followed by the network address of the transmitter (the transmitter's address), information indicating the type of the packet, information indicating the frame size, actual packet data, and finally error check, such as CRC (cyclic redundancy check) or the like, called a tailor in order to improve reliability in data transfer. Any data may be included in the packet-data portion 10002. In the present embodiment, as shown in FIGS. 9 and 10, the packet-data portion 10002 is divided into a header portion 10003 and a data-block portion 10004.

As shown in FIG. 9, the header portion 10003 of the packet-data portion 10002 includes a header code 10019 indicating header information, followed by a function-code portion 10020 indicating the function possessed by the packet data, a continuous-packet ID indicating continuous numbers when a plurality of packets constitute single data (see FIG. 11), a total-packet ID 10031 indicating the total number of packets, and a data length 10032 indicating the length of the data-block portion 10004 where actual data enters. The function-code portion 10020 includes a function ID 10021 indicating the type of the printer server, a job-type ID 10020 indicating the type of the job for the server, and a job ID 10023.

As shown in FIG. 10, the data-block portion 10004 of the packet-data portion 10002 is divided into a command block 10005, a status block 10006, an image-data block 10007, and an image-information block 10008 according to the contents of the job-type ID 10022 of the function-code portion of the header portion.

Operation of the printer server

Next, a description will be provided of the printing operation of the printer server system of the present embodiment having the above-described configuration with reference to the flowcharts.

Printing execution processing in the client computer

Figure 12:
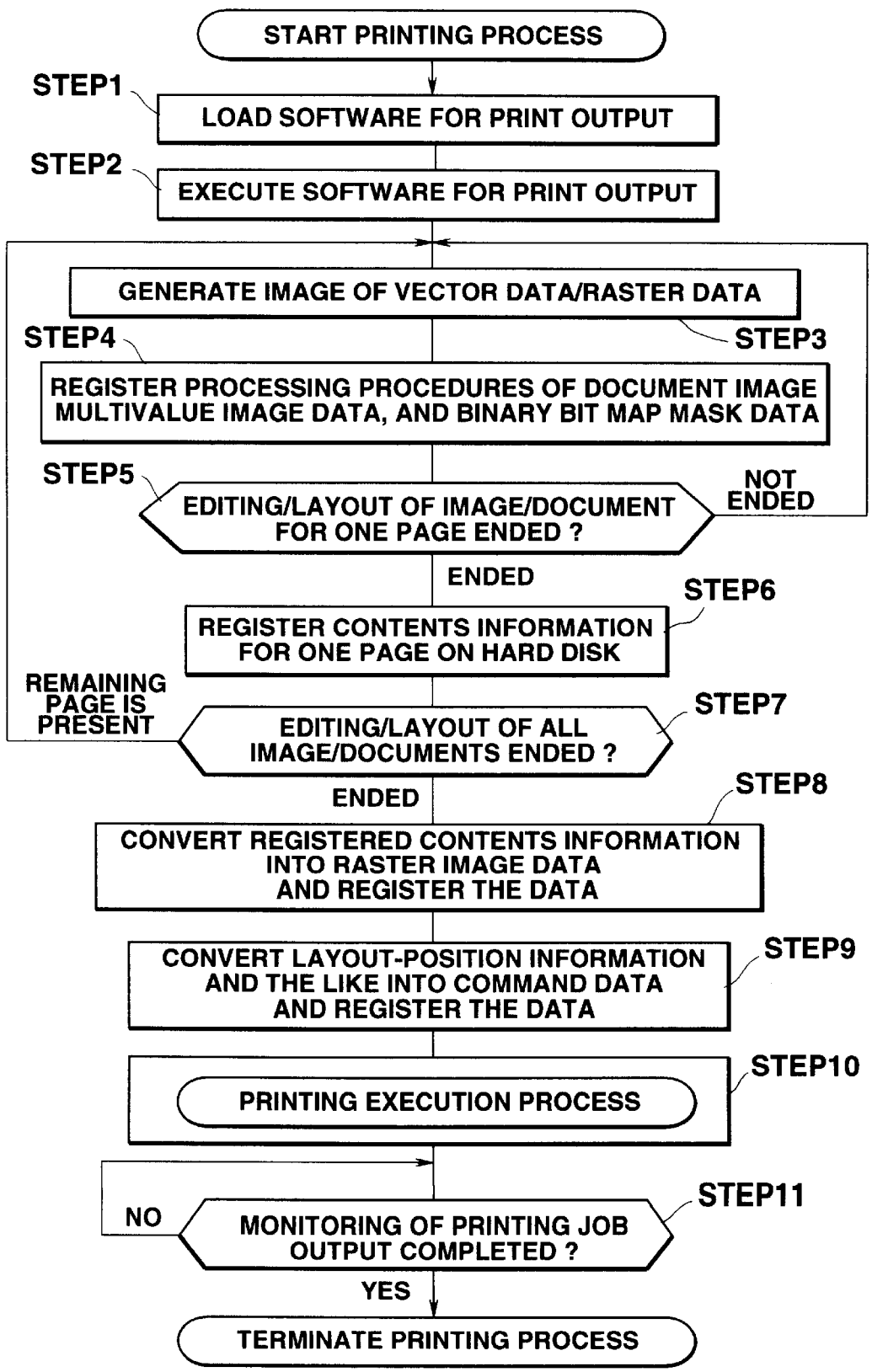
FIG. 12 is a flowchart illustrating the printing processing procedures of the printer server system in the embodiment.

FIG. 12 is a flowchart illustrating printing operation procedures in the printer server system of the embodiment.

In the client computer 400, software for print output is loaded from the hard disk 451 into the main memory 460 (step 1), and is executed by the CPU 405 (step 2). The user directly performs layout of a document and various kinds of image data (illustration formed by vectors/multivalue image data of a natural image and the like received by a scanner or the like) using the mouse 431 and the keyboard 441 while confirming the data on the display 412.

When a multivalue natural image is laid out on a document image, the image can also be cropped by masking processing using a binary bit-map image of the image.

The image-editing controller 413 registers processing procedures of an arbitrary document image to be formed/multivalue image data/binary bit-map mask image data and the like in the main memory 460 when necessary (steps 3–5). Upon completion of the contents of one page, the contents are registered on the hard disk 451 under the control of the hard-disk controller 450 (step 6).

During this processing, the document image developed in the display memory 411 by the image-editing controller 413 is displayed on the display 412. Upon completion of the editing/layout (step 7), device-driver software stored in the ROM 405 processes various kinds of information relating to the layed out document image on the hard disk 451 to convert the formed document and image into a multivalue raster-image data (step 8).

At that time, position information and the like when outputting the layed out document and image are registered together with the image data on the hard disk 451 as command data (step 9).

The obtained multivalue raster image is formed by the printer driver based on information relating to a vector system for characters, illustration and the like, data of layed out multivalue raster image comprising a natural image and the like, a mask command for mask processing, and binary bit-map mask-image data of mask data.

In step 10, a printing execution process is performed according two kinds of approaches. In one approach, the client computer 400 provides a printing request for the file server 500 in an ordinary mode. The file server 500 then performs a printing operation by accessing the printer server 200 in accordance with a queue table provided in the file server 500. In another approach, the client computer 400 performs a printing operation by directly accessing the printer server 200 without passing through the file server 500. When the completion of output has been determined as a result of monitoring of a printing job (step 11), the printing process is terminated.

Status request for file-server queue

Figure 13:
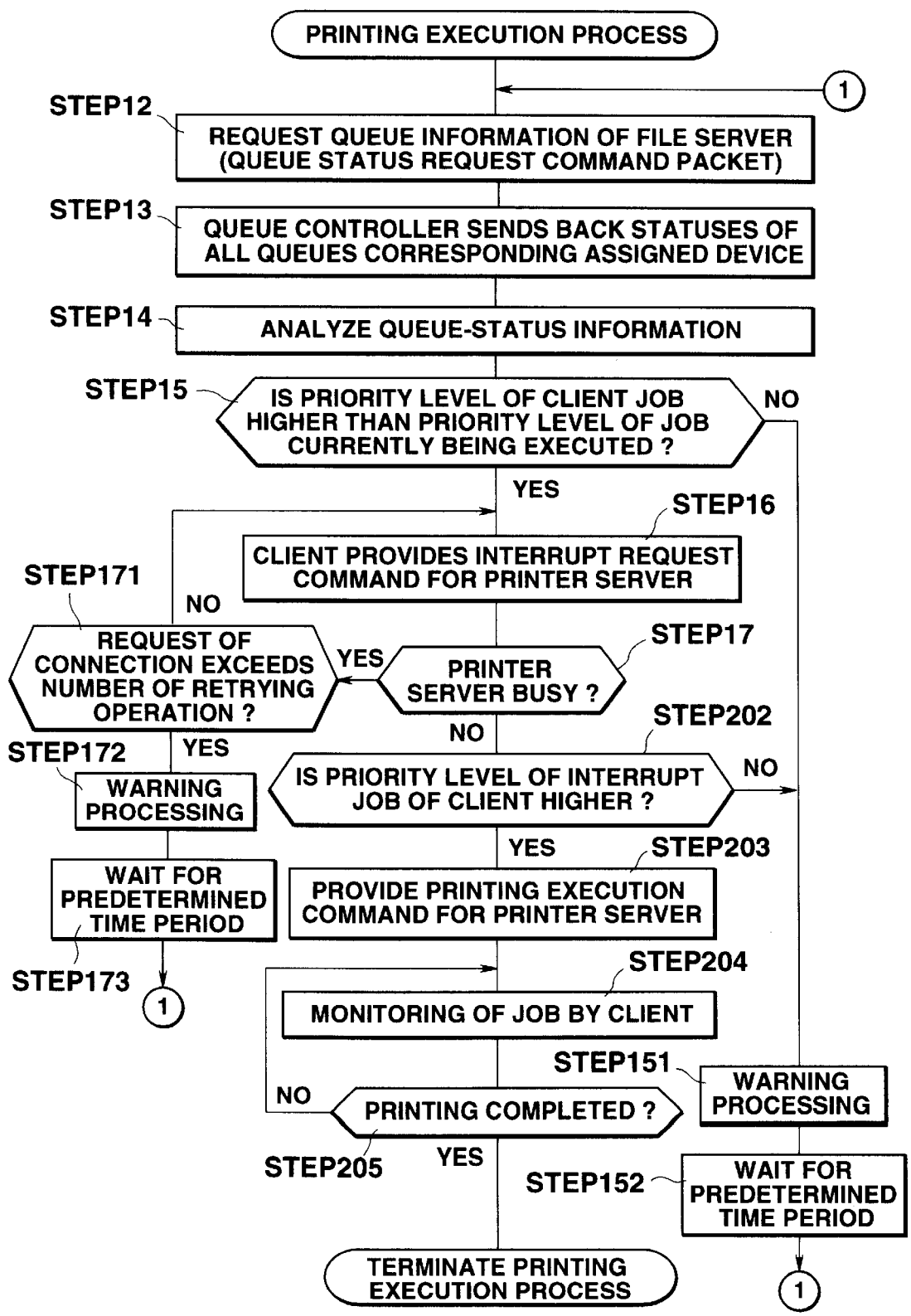
FIG. 13 is a flowchart illustrating the printing processing procedures of the client computer in the embodiment.

FIG. 13 is a flowchart illustrating processing procedures of the client computer 400 when the client computer 400 performs direct registration in the printer server 200 in the printing execution process of step 10 shown in FIG. 12. FIG. 14 is a flowchart illustrating processing procedures of the printer server 200 in the printing execution process by the above-described direct registration.

The printer driver of the client computer 400 performs communication with the network controller 520 of the file server 500 via the network controller 420. Based on the network address of the printer server registered in advance in the client computer, the network controller 420 sets the receiver's address in the packet base 10001, and indicates that the contents of execution relate to a color printer by setting an ID for a color printer uniquely determined as an ID identifying a function in the function ID 10021 of the header portion 10003.

Since the job is not yet settled at this time, '0' is set in the job ID 10023, and a uniquely determined command ID indicating a data block for a command is set as the job-type ID 10022.

At that time, a queue-status request command for obtaining information relating to the current queue state at the file server is set in the data-block portion 10004. The client computer 400 transfers this packet data to the file server 500 via the network controller 420 (step 12).

In the file server 500, the main controller 510 separates the contents of the packet into the header portion 10003 and the data block portion 10004, analyzes that the contents of the data-block portion 10004 comprise a command, and performs processing corresponding to the command. Since the request from the client computer is the queue-status request command of the file server 500, the main controller 510 of the file server 500 requests the queue controller 550 if the queue information of the printer corresponding to the assigned function ID 10021 is present. The queue controller 550 recognizes the contents of queue information by referring to the queue-table data 551.

Reference to the queue table

The queue-table data 551 provided in the file server 500 is configured such that, in order to be able to deal with a plurality of printer servers, as shown in FIG. 7, a plurality of queue tables 10209 for the corresponding printer servers are controlled within a queuing entry table 10200. FIG. 8 illustrates the contents of each of the queuing tables having a configuration in which a plurality of jobs of printing/scanning requested by the client can be registered.

The queue controller 550 checks a queue type 10303 within each of the queuing tables in order to search for data corresponding to the assigned function ID 10021. If such data is present, entire-status information is formed from the data in the queue table. If a plurality of data are present, the entire-status information for the plurality of data is formed.

The data of the entire-status information is a queue corresponding to the assigned function ID 10021, which comprises a registered-cue ID 10209, a server ID/network ID 10301 for the printer server, serving as an object of the queue, the remaining capacity 10313 of the queuing file, i.e., the registerable capacity of the queuing-file data allocated to the queue table, the total number 10306 of currently registered queues, a queue 10307 currently being executed, a priority level 10314 for that queue, an error code and the like.

The data of the entire-status information is set in the data-block portion 10004 of the packet data. The job-type ID 10022 within the header is made to be an ID for the status block and is sent back to the client computer which has provided the status request (step 13).

If queue information to be dealt with is absent, a uniquely determined error code is set in the data-block portion of the packet data and is send back to the client computer which has provided the status request.

Check of the queue table

The client computer 400 divides/analyzes the contents of the packet data sent back from the file server 500 in the same manner as for the file server, and obtains a registration queue ID corresponding to a printer server which is currently effective (step 14).

At that time, the value of the priority level 10314 of the queue 10307 currently being executed is compared with the value of the priority level set in advance in the client computer from the data of the entire-status information (step 15). The priority level transmitted in a state of being added to the entire-status information is a value for determining a change in the execution order when performing queue registration or executing scanning/printing for the file server 500, and is registered in the client-priority table 562 of the file server 500 by providing the priority order in three steps, i.e., normal, preferential, and most preferential, for each of the client computers 400.

When it has been determined in step 15 that the priority level of the client side is lower than the priority level of the queue currently being executed, the printer driver of the client side displays a warning message notifying the user of the fact that the job cannot be directly registered in/executed by the printer server 200 (step 151). After a preset time period, the above-described operation is repeated, and it is awaited that the priority level of the job being executed in the file server 500 becomes lower than the priority level of the user's job (step 152).

Interrupt of printing in the printer server

A description will now be provided of processing when the entire-status information of the file server 500 is obtained before executing direct registration in the printer server 200, and the priority level of the client's job turns out to be higher than the queue currently being executed, as a connection access to the printer server 200.

The client computer 400 obtains the network ID 10301 of the target printer server 200 from the entire-status information of the packet data returned from the file server 500 in the above-described manner. When it has been determined in step 15 that the priority level of the client side is higher than the priority level of the queue currently being executed, the client computer 400 sets an interrupt request command in the data-block portion 10004 of the packet base 10001, and transfers the command to the printer server 200 according to the above-described procedures.

As described above, the value of the priority level of the job registered in advance on the hard disk 451 of the client computer 400 is set as the parameter of the interrupt request command (step 16).

If the printer server 200 is busy as a result of determination in step 17, the client computer 400 transmits the interrupt request command to the printer server 200 at a predetermined interval, and repeats the transmission for a predetermined number of times. When there is no answer of connection during the predetermined retrying operations (the result of step 171 is affirmative), the printer driver displays a warning message to notify the user of incapability of the execution of the job (step 172). After a preset time period (step 173), the above-described operation of providing the file server 500 with a command to request provision of the entire status is repeated, and occurrence of a vacancy in the file server 500 is awaited (step 171).

During this time period, the printer server 200 executes the procedures of receiving the image data of the job currently being executed from the file server 500 and sequentially registering the received data in the raster-image data portion according to an ordinary mode, and the network-server controller 221 checks at a predetermined interval if a printing request from another client has been directly transmitted to the printer server 200.

Check of the client's interrupt level

If the current state is determined to be not busy in step 18, the printer server 200 which has received the packet of the interrupt request command from the client compares the priority level of the interrupt job with the priority level of the client job currently being executed using the client-priority table 262 (step 19).

If the priority level of the job currently being executed is determined to be higher in step 20 (a negative result), an error code indicating that the priority level of the job currently being executed is higher is set in the packet base, and the code is returned to the client side as status information (step 201).

Since the status information from the printer server 200 is an error, the printer driver of the client side determines that the priority level of the job currently being executed is higher and notifies the user of a message indicating that direct connection to the printer server 200 could not be performed (step 202). After the user has confirmed the notification, the file server 500 is again accessed after a predetermined time period set in the client computer 400, and the same procedures are repeated.

If the priority level of the job of the interrupt request is determined to be higher in step 20 (a positive result), a uniquely determined job ID for interrupt is set within the status packet and is returned to the client side in the above-described manner.

Provision of a job interrupt command

In order to interrupt the job currently being executed, the printer server 200 provides the file server 500 with a job interrupt command. The job ID executed in the printer server 200 is set as the parameter of the job interrupt command (step 21).

Reset of a job

The file server 500 detects a queue table to be dealt with from the job ID obtained from the above-described command packet, and changes the queue status to a uniquely determined value having a meaning of execution of interrupt (step 22).

Thus, the other client side executing the job knows that an interrupt has entered the job being executed from the queue status 10304 according to a monitoring method.

Transfer of a direct printing command/image data to the printer server

The printer driver of the client computer 400 checks if an interrupt has been authorized from the packet of the status returned from the printer server 200 (step 202), and provides the printer server 200 with a printing execution command when the interrupt has been authorized.

At that time, the same value as the job ID for interrupt set within the status packet obtained from the printer server 200 is set in the job ID 10023 of the packet base 10001, and the command type is set as the job-type ID 10022. Rasterized image data and command data including layout information relating to the image data registered in advance on the hard disk 451 of the client computer 400 are read. A printing execution command and parameters, such as layout information and printing information for an image to be printed and the like, are set in the data-block portion 10004 and the command portion, respectively, based on the read data. In addition, the total number of packets (including command packets) of the image-data block to be transmitted after the command block is set in the total-packet ID 10031 of the header. These packets are continuously transferred from the client computer 400 to the printer server 200 (step 203).

FIG. 11 illustrates a manner of transfer of continuous packets. First, some command packets are transferred followed by image-data packets. The continuous packet ID 10030 of the header portion has values 0, 1, . . . , (the total number of packet, ID's–1) sequentially from the leading packet (in the case of FIG. 11, since the total number of packets is "7", the continuous packet ID has values from 0 to 6).

Print output in the printer server

When the printer server 200 has received the above-described command packets/image-data packets from the client (step 23), the main controller 210 first performs setup for the image controller 710 of the raster-image storage unit via the bus controller 740 so as to operate in the above-described file control mode. The image controller 710 thereby initializes the memory controller 720 in order to control the raster-image memory 760 in the file control mode, and sets an arbitrary file ID of image data when registering for the memory controller 720 in order to register image data in the raster-image memory 760.

The memory controller 720 uses this ID for control/identification as an image-file ID.

Then, printing information/image attribute parameters and the like of the image data are set in the position-information table 770 (step 25).

Then, the main controller 210 transfers the image data portion within the received image-data packet to the raster-image memory 760. The transferred image data is controlled by being stored in a plurality of divided portions of the raster-image memory 760 in the form of an image file, and is registered in the raster-image memory 760 based on information registered in the position/attribute-information table 770 corresponding to the above-described image-file ID, such as the start address in the memory, the length and the attribute of the image data, position information of layout output of the image data, and the like (step 26).

After registering all of the image data packets, the main controller 210 sets the number of prints and layout information provided in the position/attribute-information table in the layout controller 750. The layout controller 750 performs magnification/reduction/modified editing at the assigned position with the assigned size, and transfers the obtained raster-image data to the printer unit 300 via the digital-interface controller 790, and the printer unit 300 outputs a corresponding printed image (step 27).

Setting of status information indicating execution/completion of print output, and the like The status of the interrupt processing being executed by the printer server 200 in the above-described manner can be monitored at any time from the client computer 400.

That is, when printing has been started, the main controller 210 asks the raster-image storage unit 700 about the state of printing at a predetermined interval, thereby confirming an error state relating to printing, and holds the obtained information in the main memory 260.

Monitoring of status information by the client

After providing all printing execution packets, the client computer 400 monitors the status of interrupt processing of the printer server side. The printer driver of the client computer 400 provides a job status request command via the network controller 420. This command packet is used for returning job information of the queue table of the assigned job ID as a parameter. It is thereby possible to monitor the current job information.

In the monitoring of job information, the printer driver of the client computer 400 obtains at a predetermined interval the current status of the execution process/the number of obtained prints/errors and the like from the status information obtained from the printer server.

The client side can know of the completion of printing by this monitoring function (step 205).

Resumption of the interrupted job

When the above-described printing processing has been completed as determined in step 28, the printer server 200 performs processing for resuming the interrupted job for the file server 500 (step 29).

As described above, according to the present embodiment, the client side executes an interrupt of print output by directly accessing the printer server 200 without utilizing the spooling function of the file server 500. It is thereby possible to deal with print output requiring a real-time operation in the configuration in which the printer unit 300 of the copier connected on the network 1 can be utilized by being shared by a plurality of client users.

When sharing a printer connected to the network by a plurality of client users, image output by the printer server is performed in accordance with the priority level of the client terminal providing the request for an interrupt. Hence, any inconvenience in which print output by an interrupt is performed in a disordered manner to hinder an ordinary printing operation via a file server is prevented, and real-time print output can be efficiently performed.

Although, in the above-described embodiment, the printer unit of the digital copier is used as the printer connected to the printer server 200, the present invention is not limited to such an approach. For example, a printer dedicated for printing may, of course, be used. The number of client computers, the number of file servers and the number of printing servers connected to the network are not limited to the numbers described in the embodiment, but may be appropriately selected in accordance with the scale of the system.

The present invention may be applied to a system comprising a plurality of apparatuses, or to an apparatus comprising a single unit. The present invention may, of course, be applied to a case in which the objects of the invention are achieved by supplying a system or an apparatus with programs. In such a case, the system or the apparatus can obtain the effects of the invention by reading programs represented by software for achieving the objects of the invention into the system or the apparatus from a storage medium storing such programs.

As described above, according to the present invention, in a printer server system including host computers having the functions of performing image editing and calling printing commands and the like, a file server having the functions of performing queuing of commands and image data, and a printer server having the function of performing printing in accordance with commands, the client performs a print output interrupt by directly accessing the printer server without utilizing the queuing function of the file server. The printer server compares the priority level of the job currently being executed when receiving the interrupt with the priority level of the client's job. If the priority level of the client's job is higher, the printer server performs interrupt print output by interrupting the job being executed. Hence, even in a state in which a job is subjected to queuing in the server, a new job is instantaneously executed depending on the priority level of that job, and therefore an urgent printing request or the like can be sufficiently dealt with.

The individual components shown in outline or designated by blocks in the drawings are all well known in the printer server system arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printer server system in which a plurality of client terminals including first and second client terminals are connected to a network and share a printer function, said system comprising:

comparing means for, when a first printing request for an interrupt input job having a first priority level is received from the first client terminal while another job having a second priority level is being executed by the printer function in response to a prior, second printing request from the second client terminal, comparing the first and second priority levels to determine which priority level is higher;

interrupt means for interrupting the other job when said comparing means determines that the first priority level is higher than the second priority level;

means for accepting a trigger command for print output from the first client terminal after said interrupt means has interrupted the other job; and output means for outputting an image corresponding to the trigger command.

2. A system according to claim 1, wherein a file server for performing queuing control of printing requests from respective ones of the client terminals is connected to the network.

3. A system according to claim 2, wherein the first printing request for the interrupt input job is processed without passing through said file server.

4. A system according to claim 1, wherein the other job is resumed upon said output means completing output of the image corresponding to the interrupt input job.

5. A method for controlling a printer server system in which a file server, a printer server and a plurality of client terminals including first and second client terminals are all connected to a same network, the file server controlling raster image data to be subjected to print output and controlling queuing information for performing queuing control of printing requests, said method comprising:

a comparing step of, when a first printing request for an interrupt input job having a first priority level is received from the first client terminal without passing through the file server while another job having a second priority level is being executed in response to a prior, second printing request from the second client terminal, comparing the first and second priority levels to determine which priority level is higher;

an interrupt step of interrupting the other job when said comparing step determines that the first priority level is higher than the second priority level;

a step of accepting a trigger command for print output from the first client terminal after said interrupt step has interrupted the other job; and an output step for outputting an image corresponding to the interrupt input job in response to the trigger command.

6. A method according to claim 5, further comprising the step of resuming the other job upon said output step completing output of the image corresponding to the interrupt input job.

7. A method according to claim 5, wherein the file server controls the queuing information by using table data.

8. A method according to claim 7, wherein the file server controls the queuing information and the image data separately from the table data as file data for queuing control.

9. A method according to claim 5, wherein the printer server receives the queuing information and the image data from the file server via the network.

10. A method according to claim 9, wherein the printer server performs registration and control of the image data to be subjected to queuing based on the queuing information received from the file server.

11. A method according to claim 9, wherein the file server controls the queuing information and the image data by using a unique ID recognizable in the file server.

12. A method according to claim 5, wherein the file server holds first information for determining a priority order of output of image data to be subjected to queuing, and wherein the printer server holds the second information for determining a priority order of processing of the client terminals.

13. A method according to claim 12, wherein said comparing step compares the first and second priority levels based on the first and second information.

* * * * *